United States Patent [19]
Palermo, Jr.

[11] 3,873,837
[45] Mar. 25, 1975

[54] TIRE INSPECTION APPARATUS

[75] Inventor: Anthony Palermo, Jr., South Euclid, Ohio

[73] Assignee: Picker Corporation, New York, N.Y.

[22] Filed: Dec. 7, 1970

[21] Appl. No.: 95,859

[52] U.S. Cl. .............................. 250/360, 250/358
[51] Int. Cl. ............................................ G01n 23/00
[58] Field of Search ............ 73/146; 250/51, 52, 53, 250/65 R, 90, 99, 104, 358, 360

[56] References Cited
UNITED STATES PATENTS

| | | | |
|---|---|---|---|
| 2,272,893 | 2/1942 | Bosomworth | 250/52 |
| 2,378,237 | 6/1945 | Morris | 73/67 |
| 2,547,996 | 4/1951 | Boucher | 250/90 |
| 2,692,340 | 10/1954 | Reiniger | 250/90 |
| 2,735,017 | 2/1956 | Beard et al. | 250/52 |
| 3,119,019 | 1/1964 | Henry, Jr. et al. | 250/52 X |
| 3,158,745 | 11/1964 | Stanhope | 250/99 |
| 3,329,816 | 7/1967 | Grundhauser et al. | 250/104 X |
| 3,550,443 | 12/1970 | Sherkin | 73/146 |
| 3,648,164 | 3/1972 | Searle et al. | 324/58.5 A |

Primary Examiner—Archie R. Borchelt
Assistant Examiner—B. C. Anderson
Attorney, Agent, or Firm—Watts, Hoffmann, Fisher & Heinke Co.

[57] ABSTRACT

A tire inspection apparatus includes an X-ray tube which is movable into close proximity with the rim of a tire or into the torus of the tire to provide for rim-to-rim inspection of the tire. An imaging device is moved about the exterior of the tire during inspection.

43 Claims, 7 Drawing Figures

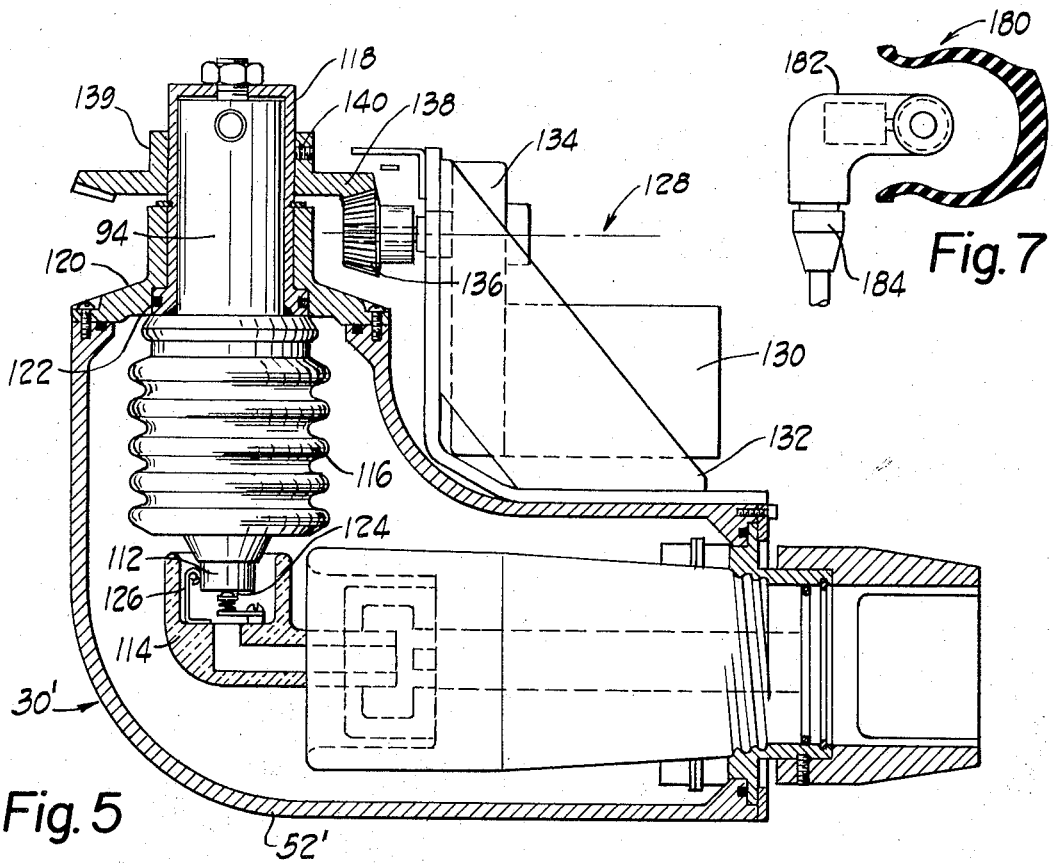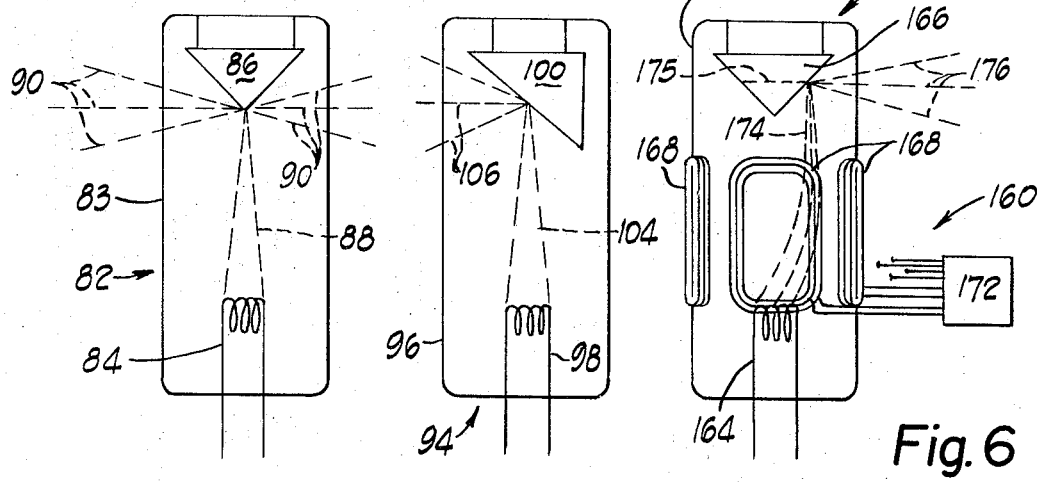
Fig. 5  Fig. 7  Fig. 3  Fig. 4  Fig. 6
INVENTOR.
ANTHONY PALERMO, JR.
BY Watts, Hoffmann, Fisher & Heinke
ATTORNEYS.

TIRE INSPECTION APPARATUS

CROSS REFERENCED PATENTS AND APPLICATIONS

Application Ser. No. 172,741, entitled TIRE INSPECTION APPARATUS, filed Aug. 18, 1971 by Donald T. Green now U.S. Pat. No. 3,761,722.

BACKGROUND OF THE INVENTION

1. Field Of The Invention

The present invention relates to tire inspection apparatus and particularly to tire inspection apparatus utilizing X-radiation to produce inspection information concerning the internal structure of tires.

2. The Prior Art

Automotive vehicle tire inspection systems utilizing X-rays have employed fluoroscopic or film techniques for imaging the internal structure of tires. One system proposed by the prior art mounted an X-ray tube near the central axis of a tire. An X-ray sensitive film or a fluoroscopic screen was disposed beyond the tire periphery so that X-rays emanating from the tube penetrated the tire and produced an image on the film or screen. The tire was rotated about its axis relative to the tube and film or screen and a succession of exposures was made so that a number of images was produced. In this way, the entire circumference of the tire was imaged. These systems were not extremely effective for inspecting rims and side walls of the tires because of the direction of the X-rays.

Another prior art proposal was to place an X-ray tube and screen or film on opposite lateral sides of the tire or a section of the tire. In some proposals, the tube was sufficiently distant from the tire that an X-ray image of the complete tire could be obtained from a single exposure. When the tube was closer, a succession of images, looking through the side walls, was produced. These proposals produced "double exposure" type images of the rims and side walls and since the tread regions of the tires were imaged from the side they were indistinct.

In still other proposals, film was placed within the torus of the tire and X-rays were directed laterally toward the film and through one tire side wall to expose the film. The tire was then physically revolved 180°, or turned around, and the process was repeated so that X-ray imaging of the opposite tire side wall was obtained. These proposals improved the images of the rims and side walls but did not image the tread regions. Furthermore, repositioning the tires by revolving them was inconvenient and time consuming.

In still other proposals, an X-ray tube was moved into juxtaposition with a tire. The tire and the X-ray tube were moved together relative to an X-ray imaging device so that X-rays passing through one tire wall and part of the tread region were imaged. The tire was rotated about its axis during this procedure.

This last mentioned apparatus was a substantial improvement over the previously proposed inspection techniques because the inspection information provided was more complete than the information provided by previous apparatus; i.e. the rims, side walls and tread region of a tire were explicity imaged. However, in order to obtain this rim-to-rim inspection, the tire had to be physically revolved by the inspector after one rim and side wall were X-rayed.

The prior art proposals which provided rim-to-rim inspection of tires all relied on tire handling or repositioning in addition to rotating the tires during inspection and thus did not provide one-step inspection of complete tires.

SUMMARY OF THE INVENTION

The present invention provides a new and improved apparatus for inspecting a tire by the use of X-rays in which rim-to-rim inspection of a tire is accomplished without repositioning the tire during inspection. The present invention provides an X-ray tube mount which is extremely manipulable so that the X-ray tube is movable into close proximity with a tire. The new apparatus produces a beam of X-rays which provides for X-ray imaging substantially 360° around the X-ray tube. When positioned within the torus of a tire, a tube of the new apparatus can provide for rim-to-rim X-ray imaging of the tire structure when an X-ray imaging device is orbited about the X-ray tube outside of the tire.

The X-ray tube mount and support of the present invention enables movement of an X-ray tube into the toroidal volume defined by a tire without interference with the tire. In particular, high voltage cables associated with the X-ray tube do not contact the tire during inspection.

In one preferred construction, the tube mount includes X-ray beam sweeping means enabling the beam produced by the tube to sweep across the inside wall of the tire. This sweeping motion of the beam enables rim-to-rim inspection of the tire without requiring repositioning of the tire in the apparatus and without further manipulation of the tube mount or associated parts. The sweeping beam is similar to the beam of light emanating from a light house.

In one preferred embodiment, an X-ray tube is rotatably mounted in its housing and is rotated by a drive transmission carried by the housing. An electric motor drives the tube. The tube can be rotated step-wise from position to position so that an X-ray beam emanating from the tube is rotated intermittently about the axis of rotation of the tube. The imaging device is likewise orbited in steps about the tire which correspond to the various X-ray beam directions. Alternatively, the beam can rotate about the tube at a predetermined rate which is synchronized with orbital movement of the imaging device around the tire and the rotational speed of the tire.

In another preferred embodiment, an X-ray tube is provided with electron beam deflecting coils disposed between a cathode and anode of the tube so that the electron beam is deflected about the anode. The anode is shaped so that when the electron beam strikes it at various locations the X-rays emitted are directed from the tube in differing directions. The anode is preferably conical so that when the electron beam moves around the tip in a circular path, a beam of X-rays sweeps about the axis of the anode.

A principal object of the present invention is the provision of a new and improved tire inspection apparatus which enables rim-to-rim X-ray inspection of tires without repositioning a tire after it has been placed in the inspection apparatus.

Other objects and advantages of the invention will become apparent from the following description of preferred embodiments made with reference to the accompanying drawings which form a part of the specification.

BRIEF DESCRIPTION OF THE DRAWINGS

FIG. 3 is a schematic illustration of an X-ray tube configuration which can be used in the apparatus of FIGS. 1 and 2;

FIG. 4 is a schematic illustration of another X-ray tube useable in connection with apparatus like that shown in FIGS. 1 and 2;

FIG. 5 is a cross sectional view of an X-ray tube mount assembly constructed according to one preferred embodiment of the invention for accommodating a tube like that shown in FIG. 4;

FIG. 6 is a schematic illustration of another X-ray tube configuration constructed according to the invention; and, FIG. 7 is a view of a modified X-ray tube mounting assembly.

DETAILED DESCRIPTION OF PREFERRED EMBODIMENTS

Figure 1:
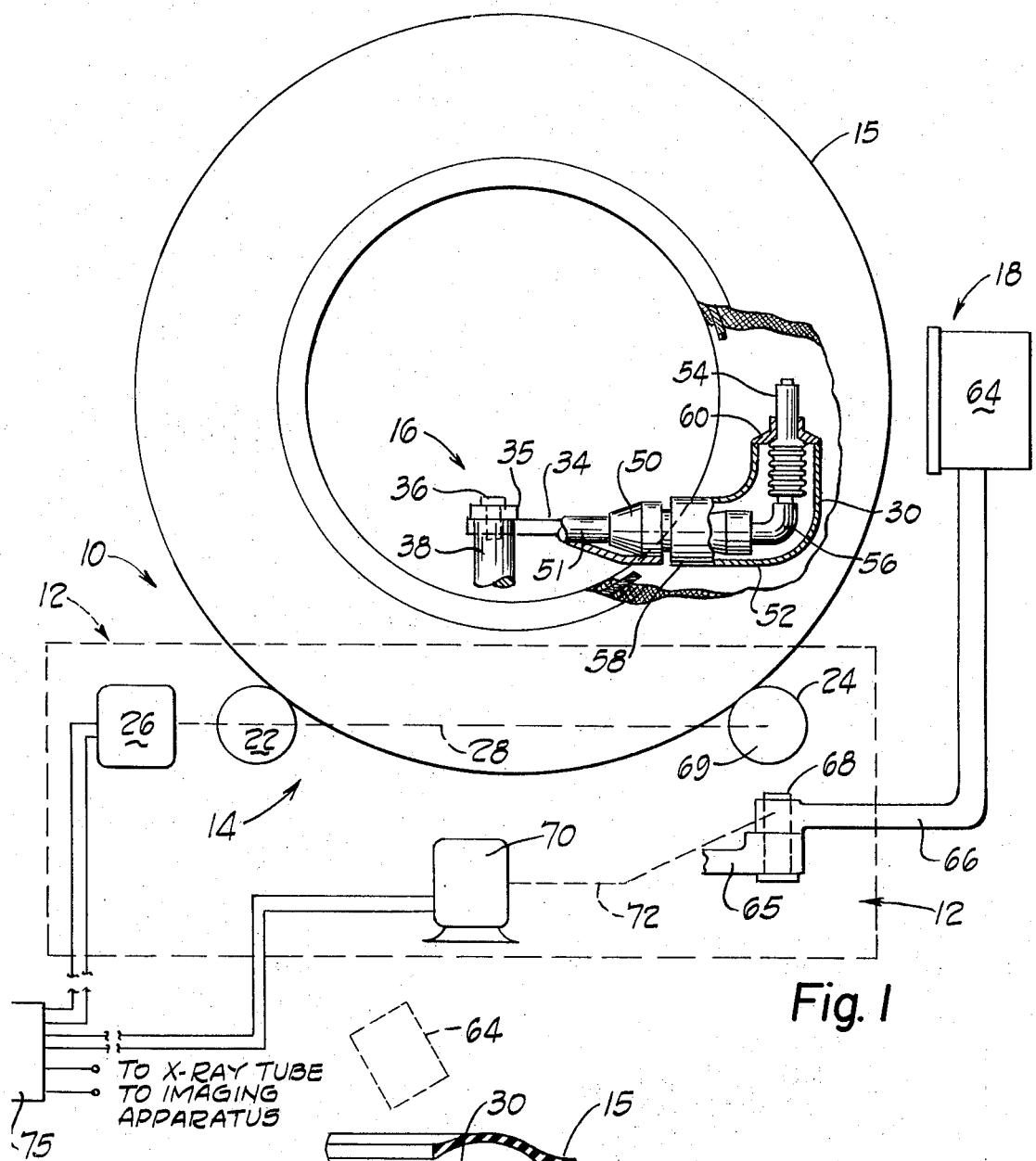
FIG. 1 is a schematic elevational view of tire inspection apparatus embodying the present invention.

A tire inspection apparatus 10 embodying the present invention is illustrated in FIG. 1. The tire inspection apparatus 10 comprises a base or a frame 12, and a tire mounting arrangement 14 for supporting a tire 15. A radiation source apparatus 16 and a radiation detection system 18 are also supported by the base 12. The base 12 can be of any suitable construction and therefore is illustrated schematically by broken lines.

The tire 15 being inspected is supported by the tire mounting arrangement 14 and is rotated about its axis during inspection. As is illustrated in FIG. 1, the tire 15 is supported on tire supporting rolls 22, 24 which extend horizontally and parallel to each other. The tire support rolls 22, 24 are rotatably driven about their axes from an electric motor 26 through a suitable drive train 28 which is schematically illustrated but may be a chain drive. The support rolls 22, 24 can be elevated relative to the frame and are movable toward and away from each other so that different tire sizes can be accommodated. The structure for positioning the rolls may be of any suitable type and is therefore not shown or described in detail.

The radiation source 16 is constructed for manipulation by the operator of the apparatus so that rim-to-rim inspection of a tire is accomplished while the tire is supported by the rolls 22, 24. The radiation source 16 comprises an X-ray tube housing assembly 30 and a tube mount manipulating structure 32. The structure 32 comprises a horizontal arm 34 connected to the tube mount assembly 30. A second horizontal arm 35 supports the arm 34 by a pivot pin 36 enabling the arm 34 and tube mount 30 to swing about the vertical axis of the pin 36. A vertical support member 38 is connected at its upper end to the arm 35 by a pivot pin 40. A third horizontal arm 42 is connected to the lower end of the vertical support member 38 by a pin and in turn is pivoted to the machine frame 12 by a pin 46. The pivotal interconnection of the various X-ray tube mount arms enables the tube mount to be cleared away from the rolls when a tire is moved into or out of the inspection position on them. When a tire is in place on the rolls, the tube mount is easily manipulable to an inspection position by moving the arms.

Figure 2:
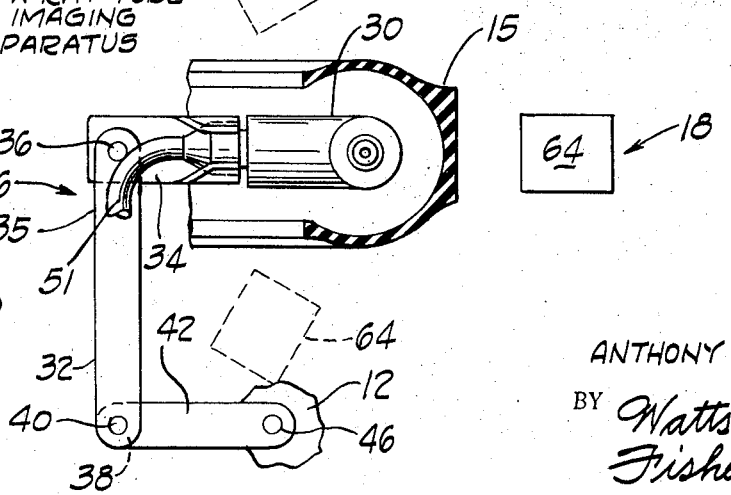
FIG. 2 is a top plan view of part of the apparatus shown in FIG. 1.

The X-ray tube mount assembly 30 is constructed for movement into proximity with the tire without creating interference between the tire and elements associated with the tube mount assembly such as a high voltage cable. As is seen in FIGS. 1 and 2, the tube mount assembly 30 includes a cable connector part 50 engaged by the arm 34. The arm 34 is shown having a socket-like end receiving the connector part 50 but any other suitable construction can be employed. The high voltage cable 51 is plugged into the connector 50 and extends from the assembly 30 along the arm 34. The connector part 50 is connected to an elbow-shaped tubular housing 52 which supports an X-ray tube schematically illustrated at 54. The tube 54 is seated in a high voltage receptacle 56 which extends through the housing 52 from the tube base to the connector part 50 at the housing end 58. The tube 54 projects from the housing 52 at about 90° to the arm 34 through a support bushing generally designated at 60. The housing is filled with transformer oil or the like.

The radiation detection system 18 is constructed to enable an X-ray detector or imaging device to orbit about part of the tire at which the X-ray tube is located to accomplish rim-to-rim imaging of the tire structure. The system 18 is schematically shown in FIGS. 1 and 2 as comprising a suitable imaging apparatus 64 which is carried by a support arm 66. The support arm 66 is pivoted to a frame member 65 by a pin 68 so that the imaging apparatus is orbitally movable about the pin 68. The frame member 65 is shiftable relative to the frame proper so that the center of movement of the imaging device is shiftable to accommodate different sized tires. The support arm 66 is also adjustable so that the imaging device is vertically movable between adjusted positions. The support arm 66 is connected to a motor 70 through a suitable drive transmission 72 which can be a chain drive and is schematically illustrated.

The X-ray imaging apparatus 64 may be of any suitable or conventional construction and accordingly is illustrated schematically and is not described in detail; suffice it to say that the imaging apparatus 64 is preferably of a type which will provide an image depicting part of the internal construction of a tire being inspected on a viewing screen at an operator's station remote from the apparatus 10. A control panel 75 is disposed at the operator's station. The panel 75 contains circuitry for controlling operation of the motors 26 and 70 and for energizing and deenergizing the X-ray tube.

The construction of an X-ray tube mount and associated manipulating structure according to the invention is particularly suited for manipulation of the tube between the tire rims and into the torus defined by the tire as is illustrated in FIGS. 1 and 2. The "torus" of the tire which is referred to is the geometric shape generated by rotating the cross sectional shape of the tire about the tire axis. The inner limit of the torus is formed by the revolution of a line segment extending between the rims generally parallel to the tire axis.

Where an X-ray tube is inserted into the torus of a tire, the X-rays produced must be directed through a wide angle about the tube in order to enable rim-to-rim imaging of the tire. Likewise, when relatively small volume tires are being inspected it is not always possible to insert the X-ray tube into the torus of the tire. Thus, as shown in FIG. 1, the tube 54 is in the torus while its housing 52 projects from the torus but is still within the annulus of the tire. With smaller tires the tube is also preferably at least partly within the torus but, as noted, cannot be entirely within the torus. In that situation, the tube will nonetheless be within the annulus of the tire.

Where smaller tires are being inspected the tube can be positioned close to one rim so that the opposite rim, side wall and most of the tread region can be imaged. Inspection is completed by moving the tube to a position close to the opposite rim and repeating the process. Wide angle X-ray generation is preferable in the inspection of such a tire. An X-ray tube which provides for a 360° throw of X-rays about the tube axis is thus suited for use in the apparatus of FIGS. 1 and 2. A 360° X-ray tube 82 is illustrated in FIG. 3. The tube 82 includes an envelope 83 surrounding a cathode 84 and a conical anode 86. An electron beam, generally designated at 88, is established in response to high voltage between the cathode and anode electrodes. The beam strikes the anode at the tip of the cone causing the emission of X-rays. The X-rays radiate 360° about the axis of the cone as is illustrated by the broken lines 90, FIG. 3. The beam angle of the X-rays is determined by the geometry of the cone. When the tube 82 is positioned in the tube mount assembly 30 of FIG. 1, the X-rays radiating 360° about the tube axis penetrate the rims, side walls and tread region of the tire in which the tube is located. As the tire is rotated, the imaging apparatus 64 is orbited about the tire so that rim-to-rim imaging of the complete tire is accomplished without repositioning the tire.

FIG. 5 shows another preferred X-ray tube mount assembly 30' and an X-ray tube 94 used in the assembly 30'. The tube 94 is schematically shown in FIG. 4 as including a suitable envelope 96, a cathode electrode 98 and a cylindrical wedge-like anode 100. An electron beam 104 established between the anode and cathode impinges on the inclined surface of the anode to produce a generally conical X-ray beam 106.

The tube 94 is carrried by the assembly 30' and is rotatable with respect to the assembly. The assembly 30' includes an elbow-shaped housing 52' which is of substantially the same construction as the housing described in reference to FIGS. 1 and 2. The tube 94 shown in FIG. 5 includes a tube base portion 112 which is supported in a receptacle 114 within the housing 52'. An insulator 116 extends upwardly from the base. A cup-like cover 118 is fixed to the insulator 116 and extends over the anode. The X-ray beam produced at the anode passes through a suitable window in the cover 118. The cover 118 is supported by a bushing 120 connected to the end of the housing 52'. The cover 118 carries a peripheral sealing ring 122 which prevents leakage of oil from the housing 52', while enabling the cover 118 to rotate relative to the bushing so that the entire tube 94 is rotatable relative to the housing 52'. As is illustrated in FIG. 5, the receptacle 114 includes contacts 124, 126 which frictionally engage the tube base 112 to maintain electrical contact with the tube base while enabling rotation of the tube in the receptacle.

The modified tube mount assembly 30' includes an X-ray beam directing system 128. The system 128 rotates the tube 94 while an X-ray beam is being generated so that the X-ray beam sweeps about the interior of the tire. The system 128 includes an electric motor 130 which is connected to the housing 52' by a bracket 132. The motor 130 drives a gear train 134 which includes an output pinion bevel gear 136. The gear 136 meshes with a bevel gear 138 having its hub 139 fixed to the cover 118 by a set screw 140.

The motor 130 is energized and deenergized from the operator's control panel so that the X-ray beam direction is controlled. In the preferred embodiment, the operator changes the positions of the imaging device and the X-ray tube in a step-wise fashion so that rim-to-rim imaging of the tire is accomplished by imaging successive circumferential sections of the tire. The motors 70 and 130 can be operated in synchronism automatically by suitable control circuitry, in which case the motors could be operated continuously throughout the inspection cycle.

Still another beam directing system 160 is schematically shown in FIG. 6, The beam directing system 160 electrically governs the X-ray beam emanating from an X-ray tube 161. The tube 161 includes an envelope 162, a cathode 164, and an anode 166. The anode 166 is shown as being conical.

A plurality of coils 168 are disposed about the envelope 162 between the anode and cathode electrodes. There are preferably four coils and each is connected to a control circuit 172 which provides current flows in the individual coils for deflecting an electron beam 174 between the cathode and anode. The electron beam deflection is illustrated in FIG. 6. The deflected electron beam impinges on the anode 166 along a circular path 175 extending about the anode. The control circuit 172 alters the fields established by the coils 168 to orbit the electron beam about the tip of the anode. This produces a rotating or sweeping X-ray beam 176.

The location on the anode at which the electron beam impinges emits X-rays in a generally conical beam so that as the electron beam moves about the path 175, the X-rays produced are directed from the tube in a rotating beam. The anode may be shaped in any form which will cause X-ray beam emissions in directions determinable by altering the field strength of the coils 168. Although an electromagnetic beam sweeping system is shown in FIG. 6, the system could be electrostatic. The beam sweeping system 160 can be operated stepwise or continuously as desired.

FIG. 7 shows another modified tube mount assembly 180. The tube mount assembly 180 is constructed from a tubular double right angle elbow housing 182. This double right angle housing provides further flexibility in manipulating the X-ray tube. In particular, the double right angle tube mount is capable of rotation about its connector arm 184 on an axis which extends parallel to the axis of rotation of the tire. Furthermore, the double right angle construction of the housing 182 permits the high voltage cable to extend from the tire generally along the axis of the connector arm 184 when the X-ray tube is positioned in the torus of the tire so that there is no possibility of interference between the high voltage cable and the tire. The double right angle housing 182 can be installed on the tube mount assembly support structure 32. An X-ray tube carried by the assembly 180 may be of any of the types described above. If a rotating tube is employed, a motor and gear train for rotating the tube is connected to the housing 182 by a bracket, as illustrated and described in connection with FIG. 5.

While a number of different embodiments of the invention have been illustrated and described, the invention is not to be considered limited to the precise constructions disclosed. It is intended that all adaptations, modifications and uses of the invention falling within the scope of the appended claims be covered.

What is claimed is:

1. A tire inspection mechanism comprising:
   a. a tire support means for mounting a tire;
   b. an X-ray source device for emitting a beam of X-rays;
   c. An X-ray responsive device positioned to be impinged by X-rays after they have once passed through a wall of a mounted tire;
   d. device support means carrying one of the devices for positioning in proximity to the beads of a supported tire and within an annulus of such tire, the device support means carrying the other device external of said annulus;
   e. manipulating means operably connected to the support means to relatively move a supported tire and the devices to direct the beam of X-rays through the tire wall from bead rim to bead rim and about the entire circumference of the tire as the device and the tire are rotated relatively about a rotational axis of the tire and the tire and at least a portion of said one device are maintained otherwise relatively fixed; and,
   f. said manipulating means maintaining sufficient alignment of the devices to develop output information with respect to the tire structure from bead rim to bead rim as the devices and tire are relatively moved and permitting all said information to be developed in a single mounting of the tire on the support means.

2. The mechanism of claim 1 wherein the source device is said one device and it includes a tube housing assembly including an X-ray tube within a housing and wherein the tube includes a target positioned near the beads.

3. The mechanism of claim 2 wherein the tube is rotatable relative to at least a portion of the housing to direct the beam from bead rim to bead rim.

4. The mechanism of claim 2 wherein the assembly includes rotative means to scan the X-ray beam from bead rim to bead rim of a tire being inspected.

5. The mechanism of claim 1 wherein said responsive device is said other device and wherein said manipulating means causes said responsive device to move in a curved path of travel about the source device and outside the tire annulus.

6. The mechanism of claim 1 wherein said manipulating means causes the X-ray beam to be swept transversely around the tire wall from one bead rim to the other as said information is developed.

7. A tire inspection mechanism comprising:
   a. a tire support means for mounting a tire;
   b. an X-ray source device for emitting a beam of X-rays;
   c. an X-ray responsive device positioned to be impinged by X-rays after they have once passed through a wall of a mounted tire;
   d. a device support means carrying one of the devices for positioning in proximity to the beads of a supported tire and within an annulus of such tire, the device support means carrying the other device external of said annulus;
   e. manipulating means operably connected to the support means to relatively move a supported tire and the devices to direct the beam of X-rays through the tire wall from bead rim to bead rim and about the entire circumference of the tire as the devices and the tire are rotated relatively about a rotation axis of the tire, and the tire and at least a portion of said one device being maintained otherwise relatively fixed;
   f. said manipulating means maintaining sufficient alignment of the devices to develop output information with respect to the tire structure from bead rim to bead rim as the devices and tire are relatively moved and permitting all of said information to be developed in a single mounting of the tire on the support means;
   g. means to energize the devices to produce an X-ray stimulated output from the X-ray responsive device; and,
   h. control means to control the relative movement of the support means caused by the manipulating means.

8. The mechanism of claim 6 wherein the sourcce device is said one device and it includes a tube housing assembly including an X-ray tube within a housing and wherein the tube includes a target positioned near the beads.

9. The mechanism of claim 8 wherein the tube is rotatable relative to at least a portion of the housing to direct the beam from bead rim to bead rim.

10. The mechanism of claim 8 wherein the assembly includes rotative means to scan the X-ray beam from bead rim to bead rim of a tire being inspected.

11. The mechanism of claim 6 wherein said responsive device is said other device and wherein said manipulating means causes said responsive device to move in a curved path of travel about the source device and outside the tire annulus.

12. The mechanism of claim 6 wherein said manipulating means causes the X-ray beam to be swept transversely around the tire wall from one bead rim to the other as said information is developed.

13. The X-ray tire inspection apparatus of claim 11, wherein said manipulator means effects such turning of a tire by power driven rollers in frictional engagement with the tire, and said apparatus further comprises adjusting means for effecting relative adjustment between said tube head and said manipulator to compensate for different tire sizes.

14. The X-ray tire inspection apparatus of claim 11, wherein said rotary movement means is in the form of an X-ray tube insert mounted for rotary movement about said beam scan axis within said tube head, and said tube head contains motor means for effecting such rotary movement of said X-ray tube insert.

15. X-ray tire inspection apparatus comprising:
   a. a manipulator for turning a tire about an axis at its center;
   b. an X-ray tube head having motor-operated rotary X-ray beam producing means therein turnable about a beam scan axis, the tube head being constructed and arranged for disposition within the annulus of said tire with the source means near the bead rims of the tire to scan the interior thereof with an X-ray beam from bead to bead;
   c. tube head support means for extension between the tire beads;

d. X-ray image pickup means for response to the X-ray beam emerging from said tire; and, e. means for effecting relative rotary movement between said manipulator means and said image pickup means in coordination with turning of said X-ray beam producing means to maintain substantial alignment of said pickup means with said X-ray beam.

16. An X-ray tire inspection mechanism comprising:

a. a tire support and manipulator for positioning a tire to be inspected at an inspection station and rotating such tire about its axis of rotation;

b. an X-ray tube head assembly including a housing;

c. an X-ray tube within the housing, the tube including an X-ray beam emitting target;

d. a tube head assembly support positioning the tube head assembly at least in part within the annulus of such a tire with the target near beads of such tire, the assembly including means to sweep the X-ray beam such that X-rays are scanned against the interior of the tire from bead to bead;

e. an X-ray stimulated device;

f. a device support for positioning the device outside of the annulus and positioning it to develop X-ray stimulated output information from bead rim to bead rim of the tire;

g. said device producing X-ray stimulated outputs when in said positions; and, h. the outputs being representative of the structure of the tire and being produced as the tire is rotated whereby circumferentially to inspect a tire from bead to bead.

17. The device of claim 16 wherein the means to scan the X-ray beam comprises rotatably mounting the X-ray tube in the housing and drive means for rotating the tube relative to at least a portion of the housing to change the direction of the X-ray beam.

18. The apparatus claimed in claim 17 wherein said drive means comprises a motor supported by said X-ray tube support and a drive transmission between said motor and said x-ray tube.

19. The apparatus claimed in claim 16 wherein said beam sweeping means comprises at least an element for electrically deflecting an electron beam in said X-ray tube whereby said electron beam creates an X-ray beam which emanates from said anode electrode in a direction which depends on the deflection of said electron beam.

20. The apparatus claimed in claim 19 wherein said anode electrode of said tube is defined by a generally conical member, said at least one element deflecting said electron beam to impinge on said anode over a generally circular path about said anode.

21. The apparatus claimed in claim 20 wherein said beam sweeping means comprises a plurality of coils for electromagnetically deflecting said electron beam.

22. A tire inspection device comprising:

a. a base;

b. tire supporting members carried by the base and adapted to support a tire for rotation about its rotational axis;

c. tire drive means for imparting rotational forces to a tire mounted on the supporting member for inspection;

d. an X-ray tube housing assembly including a housing and an X-ray tube within the housing, the tube including a target to emit a beam of X-rays;

e. the assembly also including an X-ray beam rotating means to effect relative rotation of the beam and a tire being inspected to scan the interior of the tire from bead to bead;

f. an X-ray tube support connected to the base and carrying the X-ray tube, means to move the tire being inspected and the supported tube relatively to position at least a portion of the X-ray tube housing within the annulus of the tire being inspected with the X-ray tube target near the beads of the tire being inspected;

g. an X-ray responsive output device for producing an output image of the wall structure of the tire being inspected;

h. a device support connected to the base and carrying the output device; and, i. output drive means for moving the output device around the exterior of a tire being inspected in coordination with the rotation of the X-ray tube such that the device can sequentially produce images of the structure of the tire being inspected from bead rim to bead rim and circumferentially of the tire whereby to inspect the entire tire for defects.

23. The device of claim 22 wherein the beam rotating means comprises structure connected to the tube and at least a portion of the housing to rotate the tube relative to the housing portion.

24. A tire inspection device comprising:

a. a base;

b. tire supporting members carried by the base and adapted to support a tire for rotation about its rotational axis;

c. tire drive means for imparting rotational forces to a tire mounted on the supporting members for inspection;

d. an X-ray tube housing assembly including a housing and an X-ray tube within the housing, the tube including a target to emit a beam of X-rays;

e. the assembly also including an X-ray beam rotating means to effect relative rotation of the beam and a tire being inspected to scan the interior of the tire from bead to bead;

f. an X-ray tube support connected to the base and carrying the X-ray tube, means to move the tire being inspected and the supported tube relatively to position at least a portion of the X-ray tube housing within the annulus of the tire being inspected with the X-ray tube target near the beads of the tire being inspected;

g. an X-ray responsive output device for producing an output image of the wall structure of the tire being inspected;

h. a device support connected to the base and carrying the output device;

i. output drive means for moving the output device around the exterior of a tire being inspected in coordination with the rotation of the X-ray tube such that the device can sequentially produce images of the structure of the tire being inspected from bead rim to bead rim and circumferentially of the tire whereby to inspect the entire tire for defects;

j. means to energize the X-ray tube and output device to produce an X-ray stimulated output from the X-ray responsive device; and, k. control means to control the movements caused by the drive and rotating means.

25. A method of inspecting a tire having wear, sidewall, and spaced bead rim portions, said method comprising:
   a. positioning the tire on a manipulator for inspection at an inspection station;
   b. positioning a selected one of an X-ray source device and an X-ray responsive output device within the annulus of the positioned tire and near the bead rims;
   c. positioning the other device external of the annulus;
   d. relatively rotating the positioned tire and the devices while directing an X-ray beam from the source through the tire; and,
   e. continuing the directing of the beam to stimulate the output device until X-ray stimulated output information with respect to the tire has been produced over its circumference and from one bead rim to the other whereby the tire is fully inspected after a single positioning on the manipulator.

26. The method of claim 25 including the step of sweeping the X-ray beam from one bead rim to the other as the tire is rotated.

27. The method of claim 25 wherein the one device is the X-ray source device.

28. The method of claim 25 including the step of moving the other device around the tire in a curved path transverse to the tire.

29. A method of inspecting a tire having wear, sidewall, and spaced bead rim portions, said method comprising:
   a. positioning the tire on a manipulator for inspection at an inspection station;
   b. positioning an X-ray source device within the annulus of the positioned tire and near the bead rims;
   c. positioning an X-ray responsive output device external of the annulus;
   d. relatively rotating the positioned tire and the devices while directing an X-ray beam from the source through the tire and sweeping the X-ray beam from one bead rim to the other;
   e. continuing the directing of the beam to stimulate the output device until X-ray stimulated output information with respect to the tire has been produced over its circumference and from one bead rim to the other whereby the tire is fully inspected after a single positioning on the manipulator; and,
   f. maintaining sufficient alignment of the devices as the beam is directed to produce such information.

30. The method of claim 29 including the step of moving the output device in a curved path transverse to the tire to maintain the output device in alignment with the scanned X-ray beam.

31. The method of claim 30 wherein the movement of the output device along its path is at a relatively low rate of speed compared to the rate of tire rotation.

32. The method of claim 29 wherein said beam is swept stepwise and wherein said device moves stepwise about said tube.

33. A tire inspection apparatus comprising:
   a. tire mounting means for supporting and rotating a tire about its axis;
   b. radiation source means emitting a beam of X-ray radiation from a location within the toroidal volume defined by a tire whereby as a tire rotates radiation passes through its wall from said location, said source means including means to scan said beam across the interior of the tire from bead rim to bead rim;
   c. positioning means for relatively moving a tire and said source means so that said source means moves relative to a tire to and from said location when the tire is supported by said mounting means;
   d. radiation detector means supported outside of said toroidal volume for detecting radiation which has penetrated the wall of a tire from said location;
   e. detector supporting means attached to said detector means for moving said detector means about said location;
   f. said detector supporting means and said radiation source means operatively related so that as a tire is rotated by said mounting means and the beam is scanned, said detector means is moved about said location in coordination with the beam scanning to detect the intensity of radiation which has passed through a wall of a tire from bead rim to bead rim.

34. Apparatus as claimed in claim 33 wherein said detector means comprises an imaging device for producing images of a tire wall at an operator's station, said radiation source means producing a beam of penetrative radiation passing through a tire wall and impinging on said imaging device, beam sweeping means for sweeping said beam along a tire and drive means for moving said detector means about a tire.

35. A tire inspection apparatus comprising:
   a. a tire supporting means for supporting a tire and rotating said tire about its axis;
   b. X-ray source means for emitting X-radiation in a beam;
   c. X-ray source support means for supporting said X-ray source means at an inspection position adjacent a bead rim of a tire;
   d. beam directing means for scanning said X-ray beam about a beam axis extending through said inspection position, said beam axis lying in a plane extending transverse to the axis of tire rotation and axially between the tire bead rims adjacent the inspection position, whereby said beam is directed about the interior of the tire from bead rim to bead rim; and,
   e. X-ray detector means for detecting said beam after having penetrated a tire wall, said detector means comprising a member movable about said beam axis and on which X-rays in said beam impinge.

36. Tire inspection apparatus as claimed in claim 35 wherein said X-ray source means comprises an x-ray tube and a housing, said housing having an x-ray tube supporting portion and a housing support portion, said x-ray tube projecting from said housing in a first direction and said housing support portion extending at an angle of about 90° to said first direction, said beam axis extending through said x-ray tube in said first direction.

37. The tire inspector claimed in claim 36 wherein said housing is defined by an elbow-shaped tubular member and further including support means for supporting said x-ray tube for rotation in said housing about said beam axis.

38. In combination with a tire inspection apparatus for supporting a tire having axially spaced bead rim portions and a tire axis extending centrally through said bead rim portions an x-ray source comprising:
   a. a housing;

b. means supporting said housing at a location radially adjacent a bead rim portion of a tire being inspected;

c. an x-ray beam generating means for producing an x-ray beam emanating from said location;

d. said beam generating means comprising:
  1. an x-ray tube supported by said housing having a cathode electrode and a target electrode from which x-rays emanate in a beam; and,
  2. beam sweeping means for shifting the beam of x-rays about a beam axis lying in a plane transverse to the tire axis and extending between the bead rim portions whereby the x-ray beam is swept across the interior of the tire.

39. The apparatus of claim 38 wherein said X-ray tube is rotatably supported in said housing and said beam sweeping means comprises a motor supported by said housing and a transmission between said motor and said tube by which said tube is rotated by said motor.

40. In a tire inspection apparatus an x-ray source comprising:

a. a housing;

b. an X-ray tube in said housing for producing a beam of X-rays;

c. said housing comprising tube supporting structure supporting said tube for rotation relative to said housing about an axis; and, d. tube rotating means for moving said tube about said axis said tube rotating means comprising a motor connected to said housing and a drive transmission between said motor and said X-ray tube;

e. said X-ray beam sweeping about said axis when said tube rotating means moves said tube.

41. X-ray tire inspection apparatus comprising manipulator means for turning a tire about a horizontal axis at its center, an X-ray tubehead having motor-operated rotary X-ray beam producing means therein turnable about a beam scan axis, constructed and arranged for disposition within the annulus of said tire to scan the interior thereof with an X-ray beam from bead to bead, tubehead support means for extension between the tire beads, X-ray image pickup means for response to the X-ray beam emerging from said tire, and power operated means for effecting relative rotary movement between said manipulator means and said image pickup means in synchronism with turning of said x-ray beam producing means to maintain alignment of said pickup means with said X-ray beam.

42. The X-ray tire inspection apparatus of claim 41 wherein said manipulator means effects such turning of a tire by power driven rollers in frictional engagement with the tire tread in the vicinity of the bottom of the tire, and, said apparatus further comprises adjusting means for effecting relative adjustment between said tubehead and said manipulator to compensate for different tire sizes.

43. The x-ray tire inspection apparatus of claim 41, wherein said motor operated rotary X-ray beam producing means is in the form of an X-ray tube insert mounted for rotary movement about said beam scan axis within said tubehead, and said tubehead contains motor means for effecting such rotary movement of said X-ray tube insert.

* * * * *